United States Patent [19]
Strider et al.

[11] Patent Number: 5,993,315
[45] Date of Patent: Nov. 30, 1999

[54] VIDEO GAME FOR SIMULATING A LOW RIDER VEHICLE

[76] Inventors: Walter Strider; Linda Strider, both of 1118 E. 149 St., Compton, Calif. 90220

[21] Appl. No.: 08/898,822

[22] Filed: Jul. 23, 1997

[51] Int. Cl.⁶ ..................................................... A63F 9/22
[52] U.S. Cl. .................................. 463/1; 434/61; 434/69
[58] Field of Search ................................ 434/69, 63, 62, 434/61; 463/1, 2, 23, 6, 33, 32, 31

[56] References Cited

U.S. PATENT DOCUMENTS

| | | |
|---|---|---|
| 4,521,014 | 6/1985 | Sitrick . |
| 4,643,421 | 2/1987 | Meyer et al . |
| 4,752,069 | 6/1988 | Okada . |
| 5,299,810 | 4/1994 | Pierce et al. . |
| 5,547,382 | 8/1996 | Yamashi et al. ...................... 434/69 X |
| 5,577,913 | 11/1996 | Moncrief et al. ......................... 434/69 |
| 5,660,547 | 8/1997 | Copperman ............................... 434/69 |
| 5,707,237 | 1/1998 | Takemoto et al. .................... 434/63 X |

*Primary Examiner*—Michael O'Neill

[57] ABSTRACT

A video game is provided with a matrix of switches, a CRT screen, and a video game unit. During play, a vehicle with hydraulics is displayed on the screen. Next, the switches are utilized by a player to control the displayed hydraulics of the vehicle to perform one of a plurality of techniques. Points are awarded upon the proper completion of each technique.

4 Claims, 2 Drawing Sheets

VIDEO GAME FOR SIMULATING A LOW RIDER VEHICLE

BACKGROUND OF THE INVENTION

1. Field of the Invention

The present invention relates to a video game for simulating a low rider vehicle and more particularly pertains to familiarizing a user with the use of a low rider.

2. Description of the Prior Art

The use of video games is known in the prior art. More specifically, video games heretofore devised and utilized for the purpose of providing entertainment are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,411,270; U.S. Pat. No. 5,299,810; U.S. Pat. No. 4,521,014; U.S. Pat. No. 4,738,451; U.S. Pat. No. 4,643,421; and U.S. Pat. No. 4,752,069.

In this respect, the video game for simulating a low rider vehicle according to the present invention substantially departs from the conventional concepts and designs of the prior art, and in so doing provides an apparatus primarily developed for the purpose of familiarizing a user with the use of a low rider.

Therefore, it can be appreciated that there exists a continuing need for a new and improved video game for simulating a low rider vehicle which can be used for familiarizing a user with the use of a low rider. In this regard, the present invention substantially fulfills this need.

SUMMARY OF THE INVENTION

In view of the foregoing disadvantages inherent in the known types of video games now present in the prior art, the present invention provides an improved video game for simulating a low rider vehicle. As such, the general purpose of the present invention, which will be described subsequently in greater detail, is to provide a new and improved video game for simulating a low rider vehicle which has all the advantages of the prior art and none of the disadvantages.

To attain this, the present invention essentially comprises a joy stick, a CRT screen, and a video game unit, as is convention in the art of video games. Next provided is a plurality of switches. It is important that such switches be oriented in a manner similar to that in which hydraulic switches are mounted in the art of hydraulic vehicle switch panels. In other words, the switches are situated in a matrix wherein each switch has a hydraulic and tire under its control.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved video game for simulating a low rider vehicle which has all the advantages of the prior art video games and none of the disadvantages.

It is another object of the present invention to provide a new and improved video game for simulating a low rider vehicle which may be easily and efficiently manufactured and marketed.

It is a further object of the present invention to provide a new and improved video game for simulating a low rider vehicle which is of a durable and reliable construction.

An even further object of the present invention is to provide a new and improved video game for simulating a low rider vehicle which is susceptible of a low cost of manufacture with regard to both materials and labor, and which accordingly is then susceptible of low prices of sale to the consuming public, thereby making such video game for simulating a low rider vehicle economically available to the buying public.

Still yet another object of the present invention is to provide a new and improved video game for simulating a low rider vehicle which provides in the apparatuses and methods of the prior art some of the advantages thereof, while simultaneously overcoming some of the disadvantages normally associated therewith.

Still another object of the present invention is to familiarize a user with the use of a low rider.

Lastly, it is an object of the present invention to provide a new and improved video game including a matrix of switches, a CRT screen, and a video game unit. During play, a vehicle with hydraulics is displayed on the screen. Next, the switches are utilized by a player to control the displayed hydraulics of the vehicle to perform one of a plurality of techniques. Points are awarded upon the proper completion of each technique.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
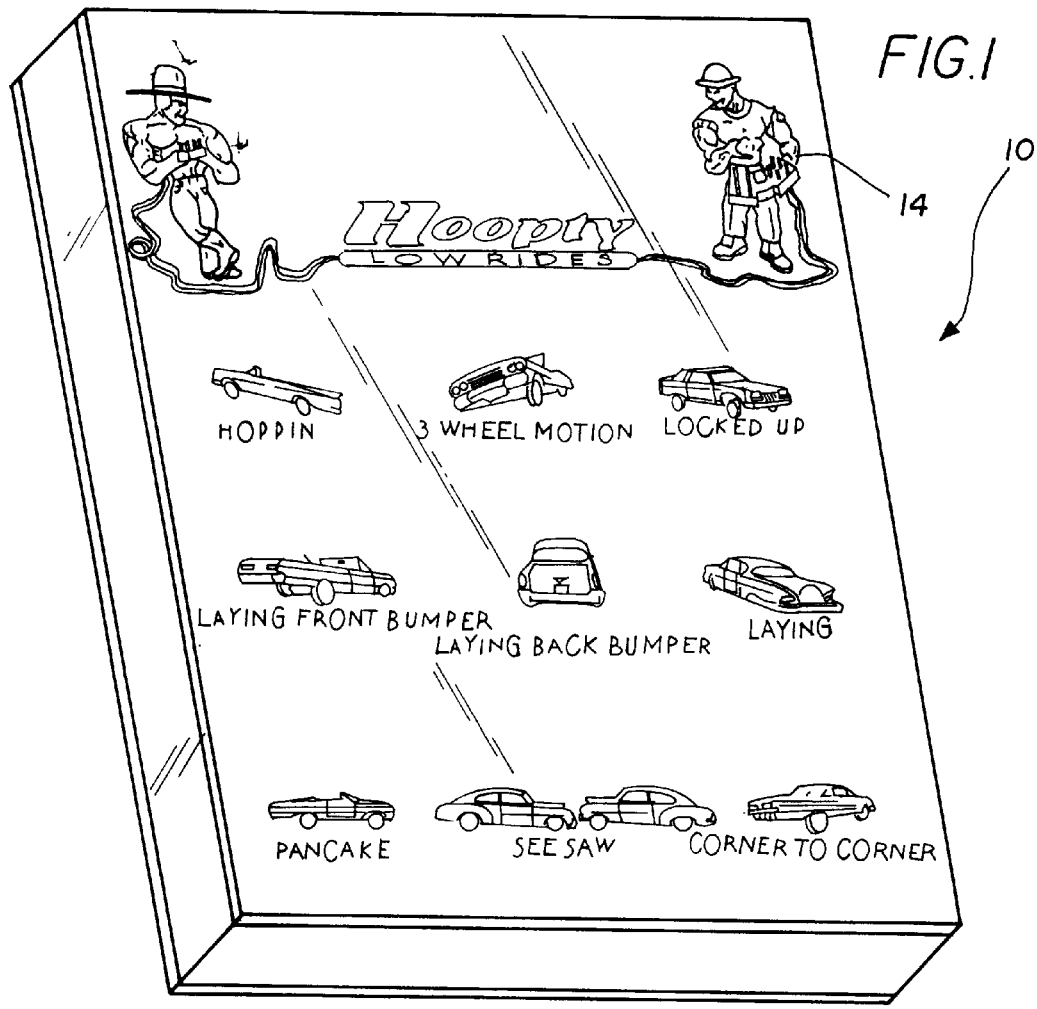
FIG. 1 is a perspective illustration of the preferred embodiment of the video game for simulating a low rider
Figure 2:
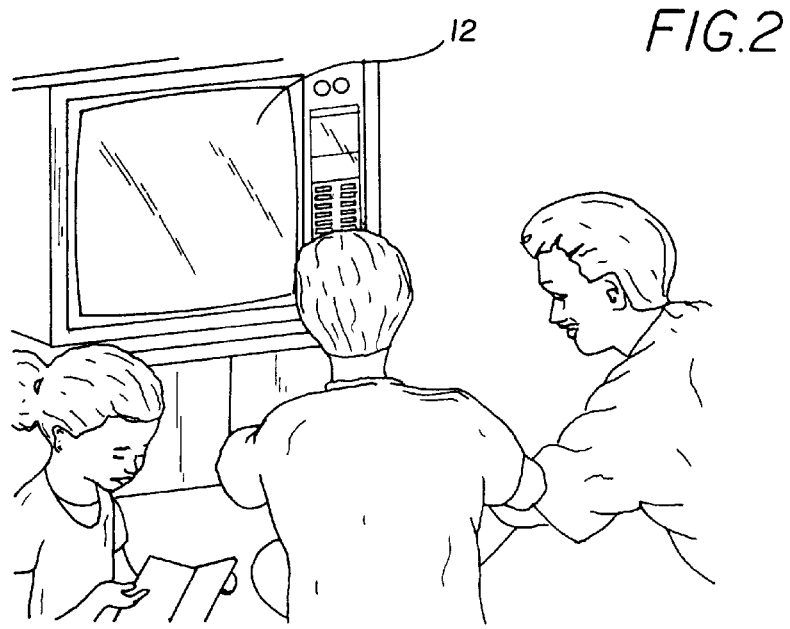
FIG. 2 is a perspective of the present invention in use.

With reference now to the drawings, and in particular to FIG. 1 thereof, a new and improved video game for simulating a low rider vehicle embodying the principles and concepts of the present invention and generally designated by the reference numeral 10 will be described.

The present invention, the new and improved video game for simulating a low rider vehicle, is comprised of a plurality of components. Such components in their broadest context includes a CRT screen, a joystick, a plurality of switches, and a video game unit. Such components are individually configured and correlated with respect to each other so as to attain the desired objective.

More specifically, it will be noted that the system 10 of the present invention includes a joy stick, a CRT screen 12, and a video game unit, as is convention in the art of video games. Next provided is a plurality of switches 14. It is important such switches be oriented in a manner similar to that in which hydraulic switches are mounted in the art of hydraulic vehicle switch panels. In other words, the switches are situated in a matrix wherein each switch has a hydraulic and tire under its control.

Figure 3:
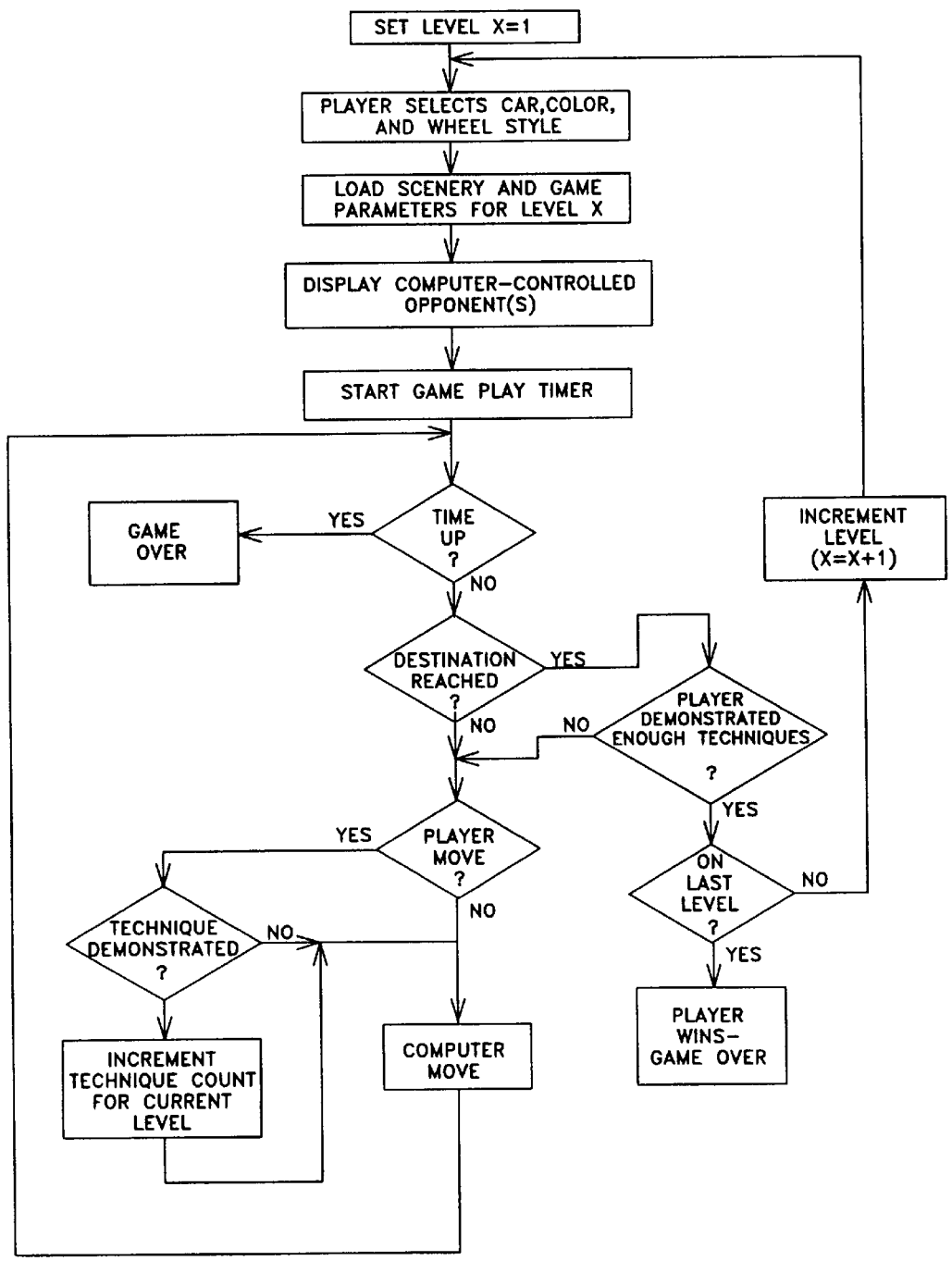
FIG. 3 is a flow chart depicting the steps of the game of the present invention.

The method of play of the present invention as facilitated by the above components will now be set forth. Note FIG. 3. Essentially, such method includes incrementing through a plurality of levels of play. Such play is defined by a plurality of functions of the foregoing components and further actions of a player. During play at each level, a vehicle to be displayed on the CRT screen is first selected from a menu displayed on the screen. Selection is implemented by the utilization of the switches and joystick. The menu allows a user to choose one of a plurality different types of vehicles, a unique color, and a wheel style. In every case, the vehicle is depicted on the screen with hydraulics situated on each of the wheels thereof.

During play at each level, further displayed on the screen is a path of travel unique to the present level of play. Such path of travel may be representative of an open road, a school, a contest, or any other scenario. Such paths of travel may be selected by the user or preselected by the video game unit. It should be noted that the path preferably comprises a displayed road with various obstacles to be described in greater detail later. Further displayed on the path is the vehicle selected in the previous steps.

Once the path and selected vehicle is displayed, a timer is initiated and a user is required to utilize the joy stick to control the displayed movement of the selected vehicle along the path of travel to reach a destination of the path of travel. While controlling the movement of the vehicle along the path of travel, the user further utilizes the switches to control the displayed hydraulics of the vehicle in manner to perform one of a plurality of techniques. As such, a player is familiarized with various techniques, or maneuvers, associated with vehicular hydraulics and the required manipulation of the switches to effect the same. Examples of such maneuvers are shown in FIG. 1. Upon the proper completion of each technique, points are awarded to the player.

To advance to the next level of play, the player must effect the arrival of the displayed vehicle at the destination of the path of travel with a predetermined amount of points. If the destination is reached without the proper amount of points, maneuvers must be performed to accumulate points. It should be noted that play is terminated upon the cessation of a predetermined amount of time which begins at the beginning of play at each level. Only upon reaching the destination at a highest level is the game won.

Each of the different levels of play is differentiated by determining a minimum amount of points that must be performed. Further, the predetermined amount of time during each level of the play is unique. Some examples of the aforementioned obstacles will now be described. First, various stationary items may be depicted on the path of travel through which the selected vehicle can not pass. Further, other opponent vehicles may be depicted on the screen. Such vehicles are controlled by the video game unit to delay the player from reaching the destination. For example, the opponent vehicle may be adapted to run the vehicle of the player off the road. It should be noted that the player is required to overcome the foregoing obstacles by performing one of the various maneuvers.

Additional information regarding the levels, types of cars, etc is as follows:

Types of Cars

Cadillac
1977 Cadillac Coupe
1978 Cadillac Coupe
1979 Cadillac Coupe
1980 Cadillac Coupe
1981 Cadillac Coupe
1982 Cadillac Coupe Brouham
1983 Cadillac Coupe Brouham
Ford
1978
1979
1956
1957
1956 Mercury
1955 Buick Hog
1956 Buick Hog
1939 Chevy
1948 Chevy
1949 Hard Top or Rag, Slant Black or Hoopty
1950 Hard Top or Rag, Slant Black or Hoopty
1951 Hard Top or Rag, Slant Black or Hoopty
1952 Hard Top or Rag, Slant Black or Hoopty
1953 Hard Top or Rag, Slant Black or Hoopty
1954 Hard Top or Rag, Slant Black or Hoopty
1955 Hard Top or Rag, or Nomad
1956 Hard Top or Rag, or Nomad
1957 Hard Top or Rag, or Nomad
1958 Hard Top or Rag and Impala
1959 Hard Top or Rag and Impala
1960 Hard Top or Rag and Impala
1961 Hard Top or Rag and Impala
1962 Hard Top or Rag, Impala and Super Sport
1963 Hard Top or Rag, Impala and Super Sport
1964 Hard Top or Rag, Malibu, Impala and Super Sport
1965 Hard Top or Rag, Malibu, Impala and Super Sport
1966 Hard Top or Rag, Malibu, Impala and Super Sport
1967 Hard Top or Rag and Impala
1968 Hard Top or Rag and Impala 1969 Hard Top or Rag Glass House
1970 Hard Top or Rag Glass House
1971 Hard Top or Rag Glass House

Level One

Player must choose a Street, Blvd or Ave to reach before the clock runs out. In doing so when the game begins the player will be approached constantly by a Hoopty lowride, the Hoopty lowride will try and keep the player from making his destination by using his lowrider techniques, the player must also use his techniques to keep the Hoopty from slowing him down, player must use at least five of the techniques. Player will select a classic car, choose color and design also select wheels of his or her choice.

Level Two

The player will compete with two Hoopty lowrides on an open road with detours. Player will choose another destination, player should use detours to get on and off the road to pass the two Hoopties, the Hoopty lowrides will use their techniques to cause confusion to the player, they will disappear and reappear in doing so each time they'll reappear there will be a different pair. Player will be timed. Player must use at least seven of the techniques. Player will select a classic car, choose color and design also select wheel of his or her choice, if desire.

Level Three

Player must use his Hydraulic switches to operate his car exactly like the Hoopty lowride and keep up, this allows the player to see and test his skills if the player does not use his switches right the car will not perform like the Hoopty lowride, but if he does, he will generate points. Player must use whatever switches the Hoopty lowride does. Player will select classic car, choose color and design also select wheels of his or her choice.

Level Four

Player must hit his switches on every Hoopty that appears and use all eleven techniques before time runs out the techniques will appear on the screen, each one at a time, what ever appears the player must do and try to be fast with it, if player finishes on time he must try it without the techniques appearing, to see if he can remember each technique. Player must use all eleven techniques.

Player will select a classic car, choose color and design also select wheels of his or her choice.

Level Five

Player must hit his switches using all eleven techniques at least twice each without them appearing on the screen a different Hoopty lowride will constantly appear.

Player must use all eleven techniques twice each.

Player will select classic car of his or her choice also choose color and design and select wheels.

Level Six

Player must compete in Hopping contest he will have t compete against three different cars. Player should hit the switches in a timely fashion to make hi car hop.

Player will choose car for this contest also wheels and design.

Level Seven

Player must go after Hoopty lowrides (call them out) he must use his skills and know how to score or beat the game with all techniques each must be used at least five times on the car he calls out. Player must prevent Hoopty lowride from leaving his street and use all eleven techniques at least five times each.

Level Eight

Player will drive toward school passing Lowride packed at the school, as player pulls up he must hit Hydraulic switches, while passing one of the lowriders who locks up his car, the player should stop along side of him and block him in and score by using his hydraulic switches, the player lets him out and then they battle it out while heading up the streets and the box the other Lowrider in at a stand still in traffic. Player must use all techniques before the Hoopty Lowride smokes his tires.

Level Nine

Player can just creep and hit his switches just to see what he runs into, player will run into two Sharpe 5A rag top with a girl driving she will clown him and run him off the road if he does the wrong thing or lay back bumper and smoke her tire on him.

Player must avoid obstacles and trick the driver and cause her to hit obstacles.

Functions of Hydraulic Switches

Three wheel motion—Drive on three wheels or swing it.

Pan cake—Hopping all four wheels off the ground.

Seesaw—Use switches to rock the car front and back like a see saw.

Corner to corner—Operating each corner individually.

Laying frame—Let the car down on the ground, scrapping to create flame.

Dragging bumper—Lay the back of the car down in the back.

Smoking the tires—Laying front and back, one foot on the brake and other on the gas pedal spinning the rear tires.

Hopping—Stand the car on the bumper.

Lock up—Car raised in its highest position.

Obstacles

Railroad tracks trains
Man hole covers
Dips
Pot hole
Dog crossing street
Elderly person crossing
Pedestrians
Police
Fire truck
Big trucks
Traffic tie up on accidents
Corners

Various Additional Methods of Scoring

Player can always Score if he uses Hydraulics before time runs out.

Player should hit Hydraulics correctly to score.

Player should slow down for dips to score.

Player can score if he hits switches before opponent.

Player can generate extra points using certain Hydraulic technique, three wheel motion, staying in lead of opponent.

Player can score if he reaches his destination before the clock runs out.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of playing an educational and entertaining game designed to teach the use of hydraulics on vehicles comprising the steps of:

providing a joy stick;

providing a plurality of switches;

providing a CRT screen;

providing a video game unit;

incrementing through a plurality of levels of play, wherein playing on each level includes the steps of:
  selecting a vehicle of a predetermined type, color, and wheel style via the depression of the switches, wherein the vehicle has hydraulics situated on each of the wheels thereof,
  displaying on the screen a path of travel unique to the present level of play,
  displaying on the screen the vehicle selected,
  utilizing the joy stick to control movement of the displayed selected vehicle along the path of travel to reach a destination,
  utilizing the switches to control the displayed hydraulics of the displayed vehicle to perform one of a plurality of techniques,
  awarding points upon the proper completion of each technique,
  advancing to the next level of play upon the arrival of the displayed selected vehicle at the destination with a predetermined amount of points,
  terminating play upon the cessation of a predetermined amount of time unique to the present level of play, and
  differentiating between the different levels of play by determining a minimum amount of points that must be performed and reducing the predetermined amount of time during each level of the play; and winning the game only upon reaching the destination at a highest level.

2. A method of playing an educational and entertaining game designed to teach the use of hydraulics on vehicles comprising the steps of:

providing a plurality of switches;

providing a screen;

providing a video game unit;
  displaying on the screen a vehicle with hydraulics;
  utilizing the switches to control the displayed hydraulics of the displayed vehicle to perform one of a plurality of techniques;
  awarding points upon the proper completion of each technique.

3. A method of playing an educational and entertaining game as set forth in claim 2 and further including the steps of:

providing a joy stick;

displaying on the screen a path of travel unique to the present level of play; and utilizing the joy stick to control movement of the displayed vehicle along the path of travel to reach a destination.

4. A method of playing an educational and entertaining game as set forth in claim 2 and further including the step of selecting a vehicle of a predetermined type, color, and wheel style via the depression of the switches, wherein the vehicle has hydraulics situated on each of the wheels thereof.

* * * * *